(12) United States Patent
Tutt et al.

(10) Patent No.: US 8,520,041 B2
(45) Date of Patent: Aug. 27, 2013

(54) FLOOR RELIEF FOR DOT IMPROVEMENT

(75) Inventors: Lee W. Tutt, Webster, NY (US);
Mitchell S. Burberry, Webster, NY (US); Dennis R. Perchak, Penfield, NY (US); Kam C. Ng, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 184 days.

(21) Appl. No.: 13/031,301

(22) Filed: Feb. 21, 2011

(65) Prior Publication Data
US 2012/0212563 A1 Aug. 23, 2012

(51) Int. Cl.
*B41J 2/435* (2006.01)

(52) U.S. Cl.
USPC .......................................... 347/224

(58) Field of Classification Search
USPC .............. 347/110, 224, 225; 264/400, 297.3, 264/515, 497; 101/395, 463.1, 465, 467
See application file for complete search history.

(56) References Cited

U.S. PATENT DOCUMENTS

| | | | |
|---|---|---|---|
| 4,060,032 A | 11/1977 | Evans | |
| 4,912,083 A | 3/1990 | Chapman et al. | |
| 4,942,141 A | 7/1990 | DeBoer et al. | |
| 4,948,776 A | 8/1990 | Evans et al. | |
| 4,948,777 A | 8/1990 | Evans et al. | |
| 4,948,778 A | 8/1990 | DeBoer et al. | |
| 4,950,640 A | 8/1990 | Evans et al. | |
| 4,952,552 A | 8/1990 | Chapman et al. | |
| 4,959,639 A | 9/1990 | Benson | |
| 5,036,040 A | 7/1991 | Chapman et al. | |
| 5,156,938 A | 10/1992 | Foley et al. | |
| 5,166,024 A | 11/1992 | Bugner et al. | |
| 5,719,009 A | 2/1998 | Fan | |
| 5,798,202 A | 8/1998 | Cushner et al. | |
| 5,804,353 A | 9/1998 | Cushner et al. | |
| 5,892,588 A | 4/1999 | Samworth | |
| 5,998,088 A | 12/1999 | Robello et al. | |
| 6,090,529 A | 7/2000 | Gelbart | |
| 6,159,659 A | 12/2000 | Gelbart | |
| 6,445,465 B1 | 9/2002 | Samworth | |
| 6,989,220 B2 | 1/2006 | Kanga | |
| 7,486,420 B2 | 2/2009 | McCrea et al. | |
| 8,034,540 B2 * | 10/2011 | Zwadlo | 430/306 |
| 2009/0223397 A1 | 9/2009 | Miyagawa et al. | |

FOREIGN PATENT DOCUMENTS

WO  WO 2005/084959  4/2005

OTHER PUBLICATIONS

Direct Laser Plate Making Consideration for Current Status; Japanese Flexo Printing Industry, Feb. 1, 2010.

* cited by examiner

*Primary Examiner* — Hai C Pham
(74) *Attorney, Agent, or Firm* — Nelson Adrian Blish

(57) ABSTRACT

Preparing a flexographic member (60) includes providing a digital image and calculating a relief image based on the digital image. At least one stress-sensitive boundary region (11) adjacent to at least one image feature is identified and the relief image is created on the flexographic member. The depth (18) of at least a portion of a floor region (10) adjacent the at least one image feature is increased to provide a modified floor region.

7 Claims, 4 Drawing Sheets

FLOOR RELIEF FOR DOT IMPROVEMENT

CROSS REFERENCE TO RELATED APPLICATIONS

Reference is made to commonly-assigned U.S. patent application Ser. No. 13/031,300 (now U.S. Publication No. 2012/0211924) filed Feb. 21, 2011, entitled FLOOR RELIEF FOR DOT IMPROVEMENT; by Tutt et al.; and U.S. patent application Ser. No. 13/031,308 (now U.S. Publication No. 2012/0210893), filed Feb. 21, 2011, entitled FLOOR RELIEF FOR DOT IMPROVEMENT; by Tutt et al.; the disclosures of which are incorporated herein.

FIELD OF THE INVENTION

The present invention relates in general to flexographic printing and in particular to providing floor relief for dot improvement.

BACKGROUND OF THE INVENTION

Flexography is a method of printing that is commonly used for high-volume relief printing runs on a variety of substrates such as paper, paper stock board, corrugated board, polymeric films, labels, foils, fabrics, and laminates. Flexographic printing has found particular application in packaging, where it has displaced rotogravure and offset lithography printing techniques in many cases.

Flexographic printing members are sometimes known as "relief printing members" and are provided with raised relief images onto which ink is applied for application to a receiver element of some type. The raised relief images are inked in contrast to the relief "floor" that remains free of ink. Such flexographic printing members (such as flexographic printing plates) are supplied to the user as an article having one or more layers optionally on a substrate or backing material. Flexographic printing can be carried out using flexographic printing plates as well as flexographic printing cylinders or seamless sleeves having a desired relief image.

Generally, flexographic printing members are produced from a photosensitive resin or elastomeric rubber. A photomask, bearing an image pattern can be placed over the photosensitive resin sheet and the resulting masked resin is exposed to light, typically UV radiation, to crosslink the exposed portions of the resin, followed by developing treatment in which the unexposed portions (non-crosslinked) of the resin are washed away with a developing liquid. Recent developments have introduced the CTP (computer-to-plate) method of creating the mask for the photosensitive resin. In this method, a thin (generally 1-5 μm in thickness) light absorption black layer is formed on the surface of the photosensitive resin plate and the resulting printing plate is irradiated imagewise with an infrared laser to ablate portions of the mask on the resin plate directly without separately preparing the mask. In such systems, only the mask is ablated without ablating the photosensitive plate precursor. Subsequently, the photosensitive plate precursor is imagewise exposed to UV light through the ablated areas of the mask, to crosslink (or harden) the exposed portions of the photosensitive resin, followed by developing treatment in which the unexposed portions (uncrosslinked) of the resin and the remaining black mask layer are washed away with a developing liquid. Both these methods involve a developing treatment that requires the use of large quantities of liquids and solvents that subsequently need to be disposed of In addition, the efficiency in producing flexographic printing plates is limited by the additional drying time of the developed plates that is required to remove the developing liquid and dry the plate. Often additional steps of post-UV exposure or other treatments are needed to harden the surface of the imaged printing plate.

While the quality of articles printed using flexographic printing members has improved significantly as the technology has matured, physical limitations related to the process of creating a relief image in a printing member still remain.

In the flexographic printing process, a flexographic printing member having a three-dimensional relief image formed in the printing surface is pressed against an inking unit (normally an Anilox roller) in order to provide ink on the topmost surface of the relief image. The inked raised areas are subsequently pressed against a suitable substrate that is mounted on an impression cylinder. As the flexographic printing member and Anilox or substrate are adjusted or limited mechanically, the height of the topmost surface determines the amount of physical impression pressure between the flexographic printing member and the Anilox or the flexographic printing member and the substrate. Areas in the relief image that are raised higher than others will produce more impression than those that are lower or even recessed. Therefore, the flexographic printing process is highly sensitive to the impression pressure that may affect the resulting image. Thus, the impression pressure must be carefully controlled. If the impression pressure is too high, some image areas can be squeezed and distorted, and if it is too low, ink transfer is insufficient. To provide the desired images, a pressman may test impression pressure settings for a given flexographic printing plate.

In particular, it is very difficult to print graphic images with fine dots, lines, and even text using flexographic printing members. In the lightest areas of the image (commonly referred to as "highlights"), the density of the image is represented by the total area of printed dots in a halftone screen representation of a continuous tone image. For amplitude modulated (AM) screening, this involves shrinking a plurality of halftone dots located on a fixed periodic grid to a very small size, the density of the highlight being represented by the area of the halftone dots. For frequency modulated (FM) screening, the size of the halftone dots is generally maintained at some fixed value, and the number of randomly or pseudo-randomly placed halftone dots represent the density of the image. In both of these situations, it is necessary to print very small dot sizes to adequately represent the highlight areas.

Maintaining small halftone dots on a flexographic printing member is very difficult due to the nature of the plate making process and the small size and lack of stability in the halftone dots. Digital flexographic printing precursors usually have an integral UV-opaque mask layer coated over a photopolymer or photosensitive layer in the relief image. In a pre-imaging (or post-imaging) step, the floor of the relief image in the printing member is set by area exposure to UV light from the back of the printing precursor. This exposure hardens the photopolymer to the relief depth required for optimal printing. This step is followed by selective ablation of the mask layer with an imagewise addressable high power laser to form an image mask that is opaque to ultraviolet (UV) light in non-ablated areas. Flood exposure to image-forming UV radiation and chemical processing are then carried out so that the areas not exposed to UV are removed in a processing apparatus using developing solvents, or by a heating and wicking process. The combination of the mask and UV exposure produces relief halftone dots that have a generally conical shape. The smallest of these halftone dots are prone to being removed during processing, which means no ink is transferred to these areas during printing (the halftone dot is not "held" or formed on the printing plate or on the printing press). Alternatively, if the small halftone dots survive processing, they are susceptible to damage on press. For example, small halftone dots often fold over or partially break off during printing, causing either excess ink, or no ink, to be transferred.

Conventional preparation of non-digital flexographic printing plates follows a similar process except that the integral mask is replaced by a separate film mask or "photo-tool" that is imaged separately and placed in contact with the flexographic printing precursor under a vacuum frame for the image-forming UV exposure.

A solution to overcome the highlight problem noted above is to establish a minimum halftone dot size during printing. This minimum halftone dot size must be large enough to survive processing, and be able to withstand printing pressure. Once this ideal halftone dot size is determined, a "bump" curve can be created that increases the size of the lower halftone dot values to the minimum halftone dot setting. However, this results in a loss of the dynamic range and detail in the highlight and shadow areas. Overall, there is less tonality and detail in the image.

Thus, it is well known that there is a limit to the minimum size of halftone dots that can be reliably represented on a flexographic printing member and subsequently printed onto a receiver element. The actual minimum size will vary with a variety of factors including printing flexographic printing member type, ink used for printing, and imaging device characteristics among other factors including the particular printing press that is used. This creates a problem in the highlight areas when using conventional AM screening since once the minimum halftone dot size is reached, further size reductions will generally have unpredictable results. If, for example, the minimum size halftone dot that can be printed is a 50×50 µm square dot, corresponding to a 5% tone at 114 lines per inch screen frequency, then it becomes very difficult to faithfully reproduce tones between 0% and 5%. A common design around this problem is to increase the highlight values in the original file to ensure that after imaging and processing, all the tonal values in the file are reproduced as printing dots and are properly formed on the printing member. However, a disadvantage of this practice is the resulting additional dot gain in the highlights that causes a noticeable transition between inked and non-inked areas.

Another known practical way of improving highlights is through the use of "Respi" or "double dot" screening as discussed in U.S. Pat. No. 7,486,420 (McCrea et al.). The problem with this type of screening technique, when applied to flexographic printing, is that the size of halftone dot that may be printed in isolation is actually quite large, typically 40-50 µm in diameter. Even when using this technique, the highlights are difficult to reproduce without having a grainy appearance, which occurs when halftone dots are spaced far apart to represent a very low density, and the printed halftone dot may also suffer an undesirable dot gain.

U.S. Pat. No. 7,486,420 discloses a flexographic screening technique that compensates for characteristic printing problems in highlight areas by selectively placing non-printing dots or pixels proximate to highlight dots. The non-printing dots or pixels raise the printing relief floor in the highlight areas providing additional support for marginally printable image features. This technique allows an image feature to be surrounded by one or more smaller non-printing features to provide an extra base of support for the image feature. While this provides an important advance in the art, it may not always completely eliminate the grainy appearance in the image.

MAXTONE screening (Eastman Kodak Company) is a known hybrid AM screening solution that overcomes some highlight and shadow reproduction limitations. MAXTONE screening software allows the operator to set a minimum dot size in order to prevent the formation of halftone dots that are too small for the flexographic medium. To extend the tonal range, MAXTONE screening software uses an FM-like screening technique in the highlights and shadows. To create lighter shades, dots are removed in a random pattern. By producing lighter colors with fewer (rather than smaller) halftone dots, improved highlight detail and a more robust flexographic printing plate are achieved. However, completely removing dots from a highlight will necessarily reduce the resolution and edge fidelity of the resulting printed images.

U.S. Pat. Nos. 5,892,588 and 6,445,465 (both Samworth) describe an apparatus and method for producing a halftone screen having a plurality of halftone dots arrayed along a desired screen frequency by deleting a number of halftone dots per unit area to obtain gray shades below a predetermined shade of gray.

Part of the problem of reproducing highlight dots, particularly when the relief pattern is formed by laser engraving, arise from the phenomenon of undercutting, or "natural" undercutting, where the top most surfaces of the smallest features are formed well below the top most surface of the flexographic printing plate due to details of the laser engraving process. This is distinct from "intentional" undercutting where laser intensity is used to purposefully reduce the level of the top most surface of a relief image feature. The terms "natural" or "naturally" imply unavoidable undercutting and is system dependent in that as the laser spot size and resolution of the engraving engine improves the size of features "naturally" undercut will be smaller.

Direct engraved printing members can typically suffer loss of highlights due to undercutting. A Feb. 1, 2010 publication by the Association of Japanese Flexo Printing Industry entitled "Direct Laser Plate Making Consideration for Current Status" describes the use of undercutting in preparing flexographic printing plates to release the printing pressure in the highlight areas. FIG. 7 in that publication shows a progressive undercutting in the relief image as the feature size is reduced. If undercutting is small, the relief in pressure on press may be desirable but when the undercutting is too great print quality suffers.

U.S Publication No. 2009/0223397 (Miyagawa et al.) describes an apparatus for forming a direct engraved convex dot on a flexographic printing plate using a light power of the light beam, which engraves all or part of an adjacent region which is adjacent to a convex portion which is to be left in a convex shape on a surface of the recording medium, is equal to or less than a threshold engraving energy, and at a region in the vicinity of an outer side of the adjacent region, the light power of the light beam is increased to a level higher than the light power used in the adjacent region. This may help to reduce the severity of undercutting by limiting the exposure at the top of the feature but will not eliminate the problem for the finest engraved features desirable.

Commonly-assigned copending U.S. patent application Ser. No. 12/868,039 proposed addressing this problem by using a combination of AM, FM, and engagement modulation, EM, screening where in a sub-area has dots each having a minimum receiver element contact area, and wherein a fraction of the dots has a topmost surface that is below the elastomeric topmost surface, but above the level that will transfer ink on press. This method can create a smoother tone scale but may be sensitive to variation of engagement for different press conditions.

In addition to these problems there are a number of inter-image effects that result from the proximity of highlight dots and other fine features that are "naturally" undercut to other image features such as solids, lines, and text. For example, in a field of highlight dots adjacent to a solid or a line or surrounded by lines, the row or rows of dots immediately proximate to the neighboring feature will lose density on the printed receiver or fail to print entirely resulting in undesirable non-uniformities.

Another inter-image effect can be observed when thin lines are proximate to solids, text or similar features. In that case a line intended to be straight will appear distorted near the neighboring feature. The line can appear curved, thicker or thinner.

Inter-image defects also occur when a field of highlight dots is adjacent to an extended area of background (i.e. an area of no printable features). In this case the dots in the last, or last few rows adjacent to the boundary often print darker than the average dots in the field and exhibit more halo effect.

Despite all of the progress made in flexographic printing to improve image quality in the highlight areas, there remains a need to improve the representation of small halftone dots and thin lines in printed flexographic images so that image detail is improved and dot gain is reduced.

SUMMARY OF THE INVENTION

Briefly, according to one aspect of the present invention, preparing a flexographic member includes providing a digital image and calculating a relief image based on the digital image. At least one stress-sensitive boundary region adjacent to at least one image feature is identified and the relief image is created on the flexographic member. The depth of at least a portion of a floor region adjacent the at least one image feature is increased to provide a modified floor region According to another aspect of the present invention a method of preparing a flexographic printing member includes the steps of forming a relief image that consists of at least coarse-featured regions but can also include fine-featured regions. A cut of increased relief is added at boundaries according to a procedure determined by the image content.

The present invention provides a method of preparing a flexographic printing member used to transfer ink from an image area to a receiver element, the flexographic printing member comprising a relief image having an image area composed of an elastomeric composition that has an elastomeric topmost surface, and a relief image floor. The method includes the steps of forming a relief image by means of direct laser engraving and an additional step of engraving cuts of increased relief image-wise. The step of adding these cuts can occur before, during or after the formation of the relief pattern. The cuts are intended to ameliorate the inter-image defects that occur due to undesirable transmission of stresses in the flexographic member on press during the printing operation. Cuts of increased relief can achieve these objectives without greatly increasing the burdens of exposure energy, material collection and material disposal associated with increasing the entire floor relief of the flexographic member.

The invention and its objects and advantages will become more apparent in the detailed description of the preferred embodiment presented below.

DETAILED DESCRIPTION OF THE INVENTION

Figure 1A:
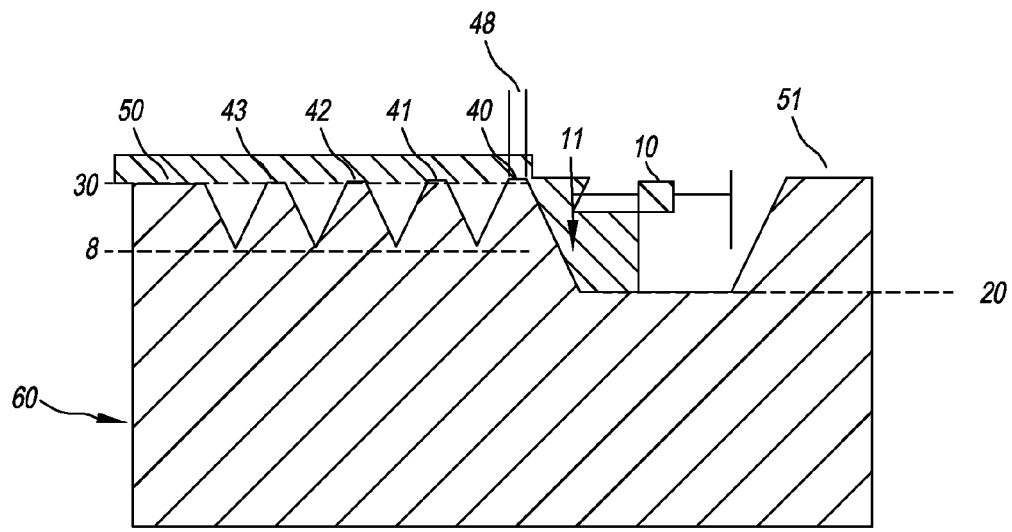
FIG. 1a is a schematic cross-sectional diagram illustrating a comparative flexographic member or sleeve having coarse features and a floor.

The present invention will be directed in particular to elements forming part of, or in cooperation more directly with the apparatus in accordance with the present invention. It is to be understood that elements not specifically shown or described may take various forms well known to those skilled in the art.

Definitions

The following definitions identify various terms and phrases used in this disclosure to define the present invention. Unless otherwise noted, these definitions are meant to exclude other definitions of the terms or phrases that may be found in the prior art.

The term "flexographic printing precursor" refers to the material that is used to prepare the flexographic printing member of this invention and can be in the form of flexographic printing plate precursors, flexographic printing cylinder precursors, and flexographic printing sleeve precursors.

The term "flexographic printing member" or "flexographic member" refers to articles of the present invention that are imaged flexographic printing precursors and can be in the form of a printing plate having a substantially planar elastomeric topmost surface, or a printing cylinder or seamless printing sleeve having a curved elastomeric topmost surface. In the case of sleeves and cylinders heights and levels are, of course, in reference to the radial direction.

The term "receiver element" refers to any material or substrate that can be printed with ink using a flexographic printing member of this invention.

The term "ablative" relates to a composition or layer that can be imaged using a radiation source (such as a laser) that produces heat within the layer that causes rapid local changes in the composition or layer so that the imaged regions are physically detached from the rest of the composition or layer and ejected from the composition or layer.

"Ablation imaging" is also known as "ablation engraving", "laser engraving" or "direct engraving".

The "elastomeric topmost surface" refers to the outermost surface of the elastomeric composition or layer in which a relief image is formed and is the first surface that is struck by imaging radiation.

The term "relief image" refers to all of the topographical features of the flexographic printing member provided by imaging and designed to transfer a pattern of ink to a receiver element.

The term "image area" refers to a predetermined area of the relief image in the elastomeric composition, which predetermined area is designed to be inked and to provide a corresponding inked image area on a receiver element.

The term "relief image floor" or "floor" refers to the bottom-most surface of the relief image excluding any cuts of increased relief as specified by the current invention. For example, the floor can be considered the maximum depth of the relief image from the elastomeric topmost surface and can typically range from 100 to 1000 μm. The relief image generally includes "valleys" that are not inked and that have a depth from the elastomeric topmost surface that is less than the maximum depth.

As used herein, the term "dot" refers to a formed protrusion or microstructure in the relief image formed in the flexographic printing member of this invention. Some publications refer to this dot as a "halftone dot". The term "dot" does not refer to the dot-like printed image on a receiver element that is provided by the dot on the flexographic printing member. However, it is desired that the dot surface area on the flexographic printing member would correspond as closely as possible to the dot-like image printed on a receiver element. Dots in the relief image smaller than a minimum dot size usually determined by specifics of the laser beam and print engine used to produce it are typically formed with top most surfaces that are below the original un-engraved surface of the member. This condition is referred to as undercutting or "natural" undercutting. A current estimate for the minimum dot size, given the best engraving systems currently available, would be approximately 30 μm by 30 μm or 900 μm$^2$ but smaller features that do not suffer from natural undercutting could become feasible as system resolution improves.

The term "fine feature" refers to any relief image feature intended to transfer ink to a receiver that is "naturally" undercut including such features as half-tone dots, stand-alone dots, fine lines, small point text or any other feature having its top most surface about 30 microns or more below the origin top most surface of the pre-engraved flexographic printing member due to the limitations of the engraving engine used to produce the relief image. A fine feature region is defined as any contiguous area of the engraved flexographic member containing only fine features.

The term "coarse feature" refers to any relief image feature intended to transfer ink to a receiver that can be formed with it top most surface within about 30 microns of the original top most surface of the pre-engraved flexographic printing member. A coarse feature region is defined as any contiguous area of the engraved flexographic member containing only coarse features. Thus all features intended to transfer ink to a receiver are either "coarse" or "fine" features and all of the image area of the flexographic printing member can be subdivide into "coarse" and "fine" regions. Both coarse-feature regions and fine featured regions can contain contiguous floor-regions having no printable features. The top most surface of a floor region is below the level that will transfer ink on a flexographic printing press under normal printing conditions.

Fine-featured relief is defined as any relief feature that is "naturally" undercut, including such features as half-tone dots, stand-alone dots, fine lines, small point text or any other feature. Naturally undercut means that the top most surface of the fine features is 30 microns or more below the origin top most surface of the pre-engraved flexographic printing member due to the limitations of the direct engraving engine used to produce the relief image. These are the features that cannot be formed with a given engraving engine without having their top most surface undercut 30 microns or more below the original surface of the flexographic printing member. With the current state of technology these fine-features typically have a shortest lateral linear dimension of about 30 microns or less. One objective of the current invention is intended to circumvent or ameliorate the deleterious effects that occur in flexographic printing on press due to natural undercutting. A fine-feature region is defined as any contiguous area of the engraved flexographic member containing only fine features.

In contrast, coarse features are those having lateral linear dimensions large enough to ensure that the top most surface of the imaged feature can be left substantially undisturbed by the engraving process when no additional leveling procedure is employed. These features are commonly solids, mid range half-tone dots and shoulder half-tone dots, wide lines and larger point text typically having a shortest lateral linear dimension on the order of 30 microns or more. A coarse feature region is defined as any contiguous area of the engraved flexographic member containing only coarse features.

Relief features are typically engraved into the flexographic printing member by scanning a single spot or multiple laser spots of intense, modulated and focused radiation over the surface of the member in the image area and collecting the ablated debris. The laser spots can be scanned over the image area of the member once or several times to control the depth of ablation. Each scan is commonly referred to as a pass. During each pass all, or part, of the image relief pattern can be addressed with predetermined laser intensity image-wise to affect the depth of ablation at every position in the final relief image.

Boundaries that benefit from cuts typically occur between coarse featured regions and floor-regions or between coarse-featured regions and fine-featured regions. These boundaries occur where stresses on press are transmitted through the flexographic member causing distortions resulting in objectionable inter-image effects in the print. These interfaces are referred to as stress-sensitive boundaries. There are several types of stress-sensitive boundaries. When, for example, a field of highlight or mid-tone dots is adjacent to an extended floor region the outer row or rows of dots print more heavily and exhibit more halo effect than the dots away from the boundary. This is called a floor-interface stress-sensitive boundary. The extent of the floor region (or floor length) refers to the shortest distance between a stress-sensitive boundary and the next nearest printable feature and determines the severity of the defect. Modeling and press data indicate that extended floor regions as short as 2 mm can be problematic for stress-sensitive boundaries and the problem becomes more severe as the distance increases. "Cuts of increased relief" or "cuts" refer to engraving increased depth of a portion of a floor region or inter-dot relief at a boundary adjacent to at least one image feature at a stress-sensitive boundary.

Another type, referred to as a fine coarse interface stress-sensitive boundary, occurs between coarse feature regions and fine feature regions. In this case modeling and press data indicate that the stress-sensitive boundary causes the last row or rows of fine features closest to the interface to print less densely or not at all as compared with the fine features farther from the boundary.

Other types of stress-sensitive boundaries can occur, leading to inter-image artifacts in prints. For example thin lines near text can appear wavy or narrowed, indicating a stress sensitive boundary between these features. Inter-image effects can appear as density non-uniformities or feature placement errors. Cuts at these stress-sensitive boundaries can reduce or eliminate the problem.

Flexographic Printing Members

The flexographic printing members prepared using the present invention can be flexographic printing plates having any suitable shape, flexographic printing cylinders, or seamless sleeves that are slipped onto printing cylinders.

Elastomeric compositions used to prepare useful flexographic printing precursors are described in numerous publications including, but not limited to, U.S. Pat. No. 5,719,009 (Fan); U.S. Pat. No. 5,798,202 (Cushner et al.); U.S. Pat. No. 5,804,353 (Cushner et al.); and WO 2005/084959 (Figov), all of which are incorporated herein by reference with respect to their teaching of laser-ablatable materials and construction of flexographic printing precursors. In general, the elastomeric composition comprises a crosslinked elastomer or a vulcanized rubber.

DuPont's Cyrel® FAST™ thermal mass transfer plates are commercially available photosensitive resin flexographic printing plate precursors that comprise an integrated ablatable mask element and require minimal chemical processing. These elements can be used as flexographic printing precursors in the practice of this invention.

For example, flexographic printing precursors can include a self-supporting laser-ablatable or engraveable, relief-forming layer (defined below) containing an elastomeric composition that forms a rubber or elastomeric layer. This layer does not need a separate substrate to have physical integrity and strength. In such embodiments, the laser-ablatable, relief-forming layer composed of the elastomeric composition is thick enough and laser ablation is controlled in such a manner that the relief image depth is less than the entire thickness, for example up to 80% of the entire thickness of the layer.

However, in other embodiments, the flexographic printing precursors include a suitable dimensionally stable, non-laser engraveable substrate having an imaging side and a non-imaging side. The substrate has at least one laser engraveable, relief-forming layer (formed of the elastomeric composition) disposed on the imaging side. Suitable substrates include but are not limited to, dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, vinyl polymer, and polystyrene films are typically used. Useful polyesters include but are not limited to poly(ethylene terephthalate) and poly(ethylene naphthalate). The substrates can have any suitable thickness, but generally they are at least 0.01 mm or more preferably from about 0.05 to about 0.3 mm thick, especially for the polymeric substrates. An adhesive layer may be used to secure the elastomeric composition to the substrate.

There may be a non-laser ablatable backcoat on the non-imaging side of the substrate (if present) that may be composed of a soft rubber or foam, or other compliant layer. This backcoat may be present to provide adhesion between the substrate and the printing press rollers and to provide extra compliance to the resulting printing member, or to reduce or control the curl of the printing member.

Thus, the flexographic printing precursor contains one or more layers. Besides the laser-engraveable, relief-forming layer, there may be a non-laser ablatable elastomeric rubber layer (for example, a cushioning layer) between the substrate and the topmost elastomeric composition forming the laser-engraveable relief-forming layer.

In general, the laser-engraveable, relief-forming layer composed of the elastomeric composition has a thickness of at least 50 μm and preferably from about 50 to about 4,000 μm, or more preferably from 200 to 2,000 μm.

The elastomeric composition includes one or more laser-ablatable polymeric binders such as crosslinked elastomers or rubbery resins such as vulcanized rubbers. For example, the elastomeric composition can include one or more thermosetting or thermoplastic urethane resins that are derived from the reaction of a polyol (such as polymeric diol or triol) with a polyisocyanate, or the reaction of a polyamine with a polyisocyanate. In other embodiments, the elastomeric composition contains a thermoplastic elastomer and a thermally initiated reaction product of a multifunctional monomer or oligomer.

Other elastomeric resins include copolymers or styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, polyalkylene oxides, or polyphosphazenes, elastomeric polymers of (meth)acrylates, elastomeric polyesters, and other similar polymers known in the art.

Still other useful laser-engraveable resins include vulcanized rubbers, such as EPDM (ethylene-propylene diene rubber), Nitrile (Buna-N), Natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber.

Still other useful laser-engraveable resins are polymeric materials that, upon heating to 300° C. (generally under nitrogen) at a rate of 10° C./minute, lose at least 60% (typically at least 90%) of their mass and form identifiable low molecular weight products that usually have a molecular weight of 200 or less. Specific examples of such laser engraveable materials include but are not limited to, poly(cyanoacrylate)s that include recurring units derived from at least one alkyl-2-cyanoacrylate monomer and that forms such monomer as the predominant low molecular weight product during ablation. These polymers can be homopolymers of a single cyanoacrylate monomer or copolymers derived from one or more different cyanoacrylate monomers, and optionally other ethylenically unsaturated polymerizable monomers such as (meth) acrylate, (meth)acrylamides, vinyl ethers, butadienes, (meth) acrylic acid, vinyl pyridine, vinyl phosphonic acid, vinyl sulfonic acid, and styrene and styrene derivatives (such as a-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly(cyanoacrylates) include but are not limited to poly(alkyl cyanoacrylates) and poly(alkoxyalkyl cyanoacrylates) such as poly(methyl-2-cyanoacrylate), poly (ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.)

In still other embodiments, the laser-engraveable elastomeric composition can include an alkyl-substituted polycarbonate or polycarbonate block copolymer that forms a cyclic alkylene carbonate as the predominant low molecular weight product during depolymerization from engraving. The polycarbonate can be amorphous or crystalline, and can be obtained from a number of commercial sources including Aldrich Chemical Company (Milwaukee, Wis.). Representative polycarbonates are described for example in U.S. Pat. No.

5,156,938 (Foley et al.), columns 9-12, which are incorporated herein by reference. These polymers can be obtained from various commercial sources or prepared using known synthetic methods.

In still other embodiments, the laser-engraveable polymeric binder is a polycarbonate (tBOC type) that forms a diol and diene as the predominant low molecular weight products from depolymerization during laser-engraving.

The laser-engraveable elastomeric composition generally comprises at least 10 weight % and up to 99 weight %, and typically from about 30 to about 80 weight %, of the laser-engraveable elastomers or vulcanized rubbers.

In some embodiments, inert microcapsules are dispersed within laser-engraveable polymeric binders. For example, microcapsules can be dispersed within polymers or polymeric binders, or within the crosslinked elastomers or rubbery resins. The "microcapsules" can also be known as "hollow beads", "microspheres", "microbubbles", "microballoons", "porous beads", or "porous particles". Such components generally include a thermoplastic polymeric outer shell and either core of air or a volatile liquid such as isopentane and isobutane. These microcapsules can include a single center core or many interconnected or non-connected voids within the core. For example, microcapsules can be designed like those described in U.S. Pat. No. 4,060,032 (Evans) and U.S. Pat. No. 6,989,220 (Kanga), or as plastic micro-balloons as described for example in U.S. Pat. No. 6,090,529 (Gelbart) and U.S. Pat. No. 6,159,659 (Gelbart).

The laser-engraveable, relief-forming layer composed of the elastomeric composition can also include one or more infrared radiation absorbing compounds that absorb IR radiation in the range of from about 750 to about 1400 nm or typically from 750 to 1250 nm, and transfer the exposing photons into thermal energy. Particularly useful infrared radiation absorbing compounds are responsive to exposure from IR lasers. Mixtures of the same or different type of infrared radiation absorbing compound can be used if desired. A wide range of infrared radiation absorbing compounds are useful in the present invention, including carbon blacks and other IR-absorbing organic or inorganic pigments (including squarylium, cyanine, merocyanine, indolizine, pyrylium, metal phthalocyanines, and metal dithiolene pigments), iron oxides and other metal oxides.

Additional useful IR radiation absorbing compounds include carbon blacks that are surface-functionalized with solubilizing groups are well known in the art. Carbon blacks that are grafted to hydrophilic, nonionic polymers, such as FX-GE-003 (manufactured by Nippon Shokubai), or which are surface-functionalized with anionic groups, such as CAB-O-JET® 200 or CAB-O-JET® 300 (manufactured by the Cabot Corporation) are also useful. Other useful pigments include, but are not limited to, Heliogen Green, Nigrosine Base, iron (III) oxides, transparent iron oxides, magnetic pigments, manganese oxide, Prussian Blue, and Paris Blue. Other useful IR radiation absorbing compounds are carbon nanotubes, such as single- and multi-walled carbon nanotubes, graphite, graphene, and porous graphite.

Other useful infrared radiation absorbing compounds (such as IR dyes) are described in U.S. Pat. No. 4,912,083 (Chapman et al.), U.S. Pat. No. 4,942,141 (DeBoer et al.), U.S. Pat. No. 4,948,776 (Evans et al.), U.S. Pat. No. 4,948,777 (Evans et al.), U.S. Pat. No. 4,948,778 (DeBoer), U.S. Pat. No. 4,950,639 (DeBoer et al.), U.S. Pat. No. 4,950,640 (Evans et al.), U.S. Pat. No. 4,952,552 (Chapman et al.), U.S. Pat. No. 4,973,572 (DeBoer), U.S. Pat. No. 5,036,040 (Chapman et al.), and U.S. Pat. No. 5,166,024 (Bugner et al.).

Optional addenda in the laser-engraveable elastomeric composition can include but are not limited to, plasticizers, dyes, fillers, antioxidants, antiozonants, stabilizers, dispersing aids, surfactants, dyes or colorants for color control, and adhesion promoters, as long as they do not interfere with engraving efficiency.

The flexographic printing precursor can be formed from a formulation comprising a coating solvent, one or more elastomeric resins, and an infrared radiation absorbing compound, to provide an elastomeric composition. This formulation can be formed as a self-supporting layer or applied to a suitable substrate. Such layers can be formed in any suitable fashion, for example by injecting, spraying, or pouring a series of formulations to the substrate. Alternatively, the formulations can be press-molded, injection-molded, melt extruded, co-extruded, or melt calendared into an appropriate layer or ring (sleeve) and optionally adhered or laminated to a substrate and cured to form a layer, flat or curved sheet, or seamless printing sleeve. The flexographic printing precursors in sheet-form can be wrapped around a printing cylinder and fused at the edges to form a seamless printing precursor.

Method of Forming Flexographic Printing Member

Ablation or engraving energy can be applied using a suitable laser such as a $CO_2$, infrared radiation-emitting diode, or YAG lasers, or an array of such lasers. Ablation engraving is used to provide a relief image with a minimum floor depth of at least 100 µm or typically from 300 to 1000 µm. However, local minimum depths between halftone dots can be less. The relief image may have a maximum depth up to about 100% of the original thickness of the laser-engraveable, relief-forming layer when a substrate is present. In such instances, the floor of the relief image can be the substrate if the laser-engraveable, relief-forming layer is completely removed in the image area, a lower region of the laser-engraveable, relief-forming layer, or an underlayer such as an adhesive layer, compliant layer, or a non-ablative elastomeric or rubber underlayer. When a substrate is absent, the relief image can have a maximum depth of up to 80% of the original thickness of the laser-engraveable, relief-forming layer comprising the elastomeric composition. A laser operating at a wavelength of from about 700 nm to about 11 µm is generally used, and a laser operating at from 800 nm to 1250 nm is more preferable. The laser must have a high enough intensity that the pulse or the effective pulse caused by relative movement is deposited approximately adiabatically during the pulse. Pulse duration is typically much less than 1 ms.

Generally, engraving is achieved using at least one infrared radiation laser having a minimum fluence level of at least 1 $J/cm^2$ at the elastomeric topmost surface and typically infrared imaging is at from about 20 to about 1000 $J/cm^2$ or more preferably from about 50 to about 800 $J/cm^2$.

Engraving a relief image can occur in various contexts. For example, sheet-like precursors can be imaged and used as desired, or wrapped around a printing cylinder or cylinder form before imaging. The flexographic printing precursor can also be a printing sleeve that can be imaged before or after mounting on a printing cylinder.

During imaging, most of the removed products of engraving are gaseous or volatile and readily collected by vacuum for disposal or chemical treatment. Any solid debris can be similarly collected using vacuum or washing.

After imaging, the resulting flexographic printing member can be subjected to an optional detacking step if the elastomeric topmost surface is still tacky, using methods known in the art.

During printing, the resulting flexographic printing member is inked using known methods and the ink is appropriately transferred to a suitable receiver element.

After printing, the flexographic printing member can be cleaned and reused. The printing cylinder can be scraped or otherwise cleaned and reused as needed.

Referring now to FIG. 1a shows a comparative flexographic member 60, for example, plate or sleeve, having an original top most flexographic plate member surface 30 and floor relief level 20 with an engraved relief pattern having coarse features, 50, 51 and coarse highlight features 40, 41, 42, 43, floor region extent 10 and a stress-sensitive boundary 11. The top most surface of coarse highlight features has dot size 48. The side walls of features in this diagram are represented as straight sloped walls and have a lowest inter-dot relief at level 8 but it is understood that the side walls of the actual relief image can be vertical, sloped or curved or can have plateaus below the top most surface of the feature or any combination of these patterns. In reference to the field of highlight features, the outer-dot coarse highlight feature 40 represents the dots closest to the stress-sensitive boundary and inner-dot coarse highlight feature 43 represents dots farthest from stress-sensitive boundaries.

Figure 1B:
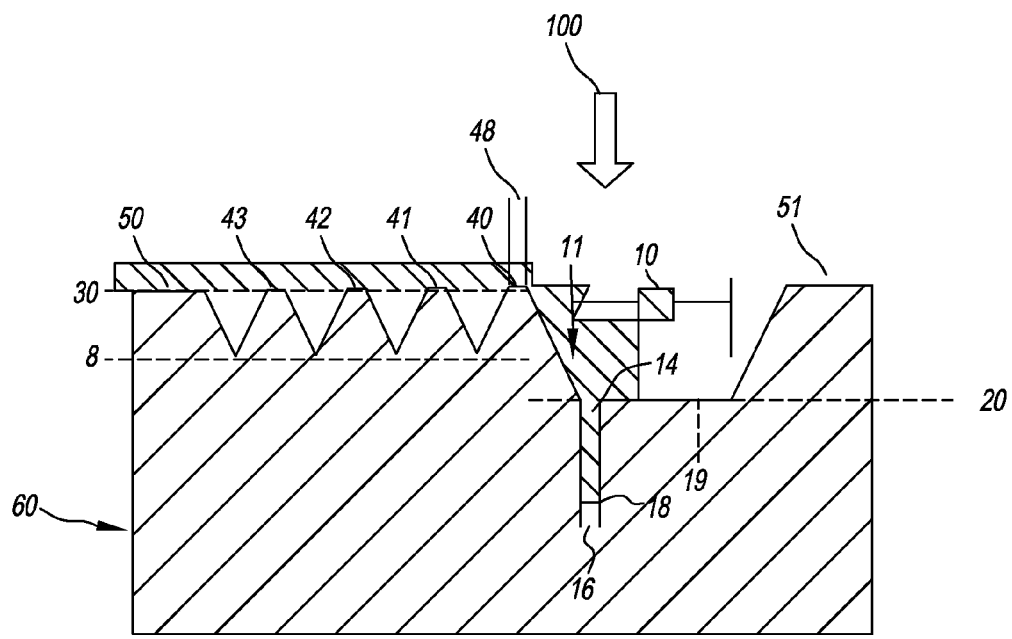
FIG. 1b is schematic cross-sectional diagram of an embodiment of the current invention showing a cut of increased relief adjacent to at least one image feature.

The current invention can be understood with reference to a cross-sectional diagram of the current invention in FIG. 1b showing laser radiation, 100, used to selectively modify the floor by engraving floor-interface stress-sensitive boundary increased relief 14 having a floor-interface stress-sensitive boundary increased relief width 16 at a floor-interface stress-sensitive boundary 11. The coarse features have an original top most surface coincident with the top most surface 30 of the flexographic member 60 prior to engraving. Laser radiation engraves down to a floor-interface stress-sensitive boundary relief level 18 at least 30 µm below the floor level 20 in the final relief image. In this example the stress-sensitive boundary 11 occurs at the boundary between the highlight features 40, 41, 42, 43, and the floor region 10. A cut of increased relief 14 has a depth of at least 30 µm below the floor level 20 and a width 16 of at least 10 µm and less than half 19 the total distance to the next closest printable feature.

Figure 2A:
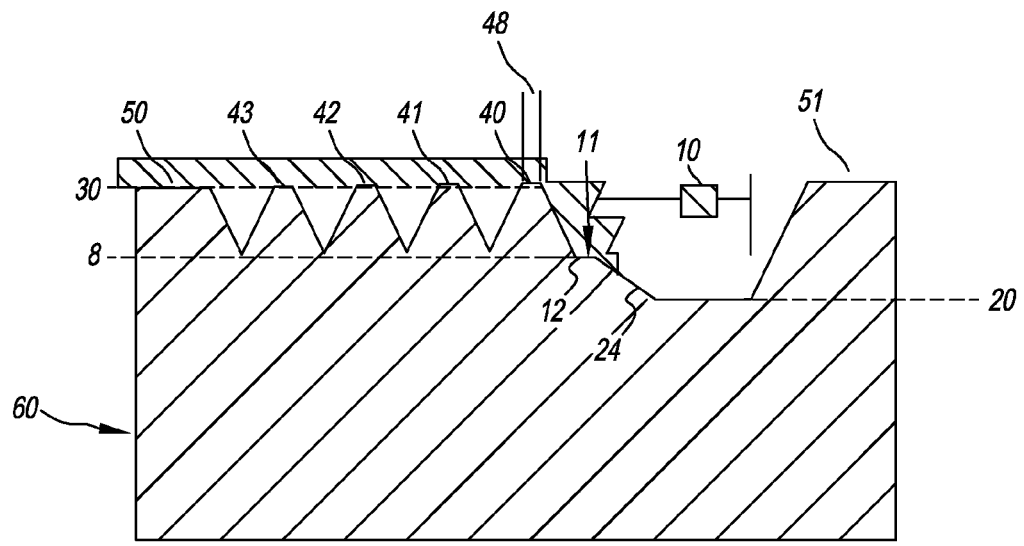
FIG. 2a is a schematic cross-sectional diagram illustrating a comparative flexographic member or sleeve showing a sloped wall adjacent the at least one coarse feature region.

FIG. 2a shows a comparative flexographic member 60, having an original top most flexographic plate member surface 30 and floor level 20 with an engraved relief pattern having coarse features 50, 51 and highlight features 40, 41, 42, 43, floor region 10, and boundary 11. The side walls at the boundary 11 of this representative illustration have a non-printable plateau 12 and a non-printable plateau angled wall 24.

Figure 2B:
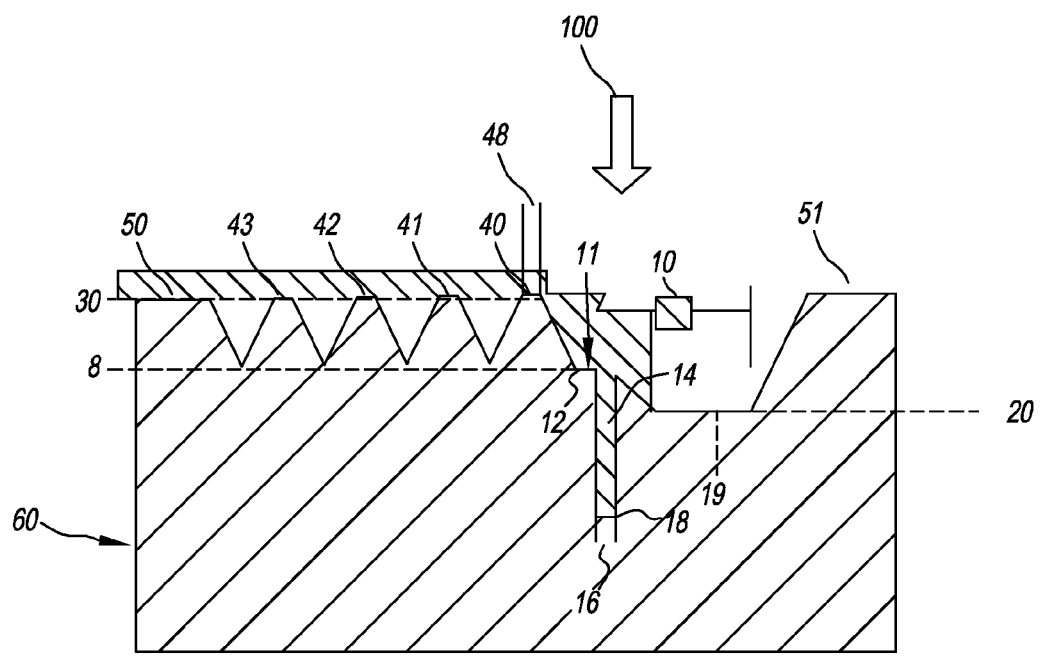
FIG. 2b is schematic cross-sectional diagram of a flexographic member or sleeve showing of the current invention having a sloped wall adjacent to at least one coarse feature region and a cut of increased relief adjacent to said coarse feature region.

An embodiment of the current invention is schematically represented in FIG. 2b showing laser radiation 100 used to selectively engrave cuts of increased relief 14 having a width 16 at a stress-sensitive boundary 11. Laser radiation 100 engraves down to a level 18 at least 10 µm below the floor relief level 20. The width 16 of the cut is at least 10 µm and less than half 19 the total distance to the next printable feature.

Figure 3A:
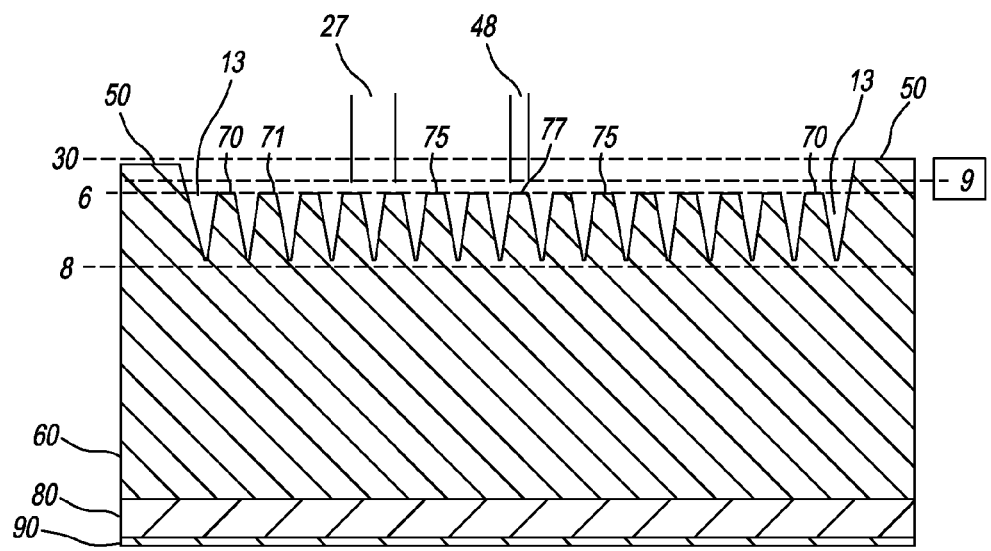
FIG. 3a is a schematic cross-sectional diagram illustrating a comparative flexographic member or sleeve having fine features adjacent to coarse features.

FIG. 3a is a schematic cross-sectional diagram illustrating a comparative flexographic member having coarse features 50, and fine features 70, 71, 75, 77 having an inter dot spacing 27 determined by the halftone screen ruling and fine-feature top most level 6, below the critical printable level 9 for transferring ink on press. The flexographic member is shown with a supporting layer 80 and a backing layer 90. The fine features 70, 71, 75, 77 have coarse highlight feature dot size 48 that are small compared to size of the spot used to laser engrave the relief pattern and are therefore "naturally" undercut to a level 6 below a critical level 9 that results in features that print chaotically or not at all on press. Fine coarse interface stress-sensitive boundary 13 are illustrated between the last rows of fine-feature dots and the coarse features. Fine feature inner dot 77 represents the dot farthest from the stress-sensitive boundary and fine feature outer dots 70 represent the dots closest to the stress-sensitive boundary.

Figure 3B:
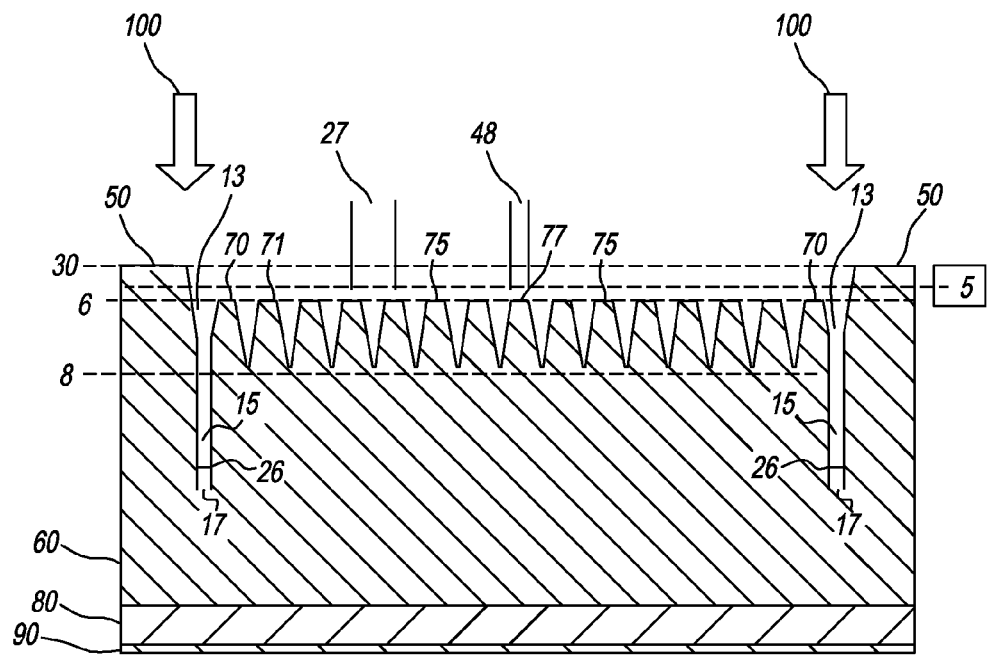
FIG. 3b is schematic cross-sectional diagram of the current invention showing cuts of increased relief between coarse and fine features.

A representation of another embodiment of the current invention, FIG. 3b, shows laser radiation, 100, used to selectively engrave cuts of fine coarse interface stress-sensitive boundary increased relief 15 having a fine coarse interface stress-sensitive boundary width 17 at a boundary 13 between the last rows of fine-feature dots 70, 71, 75, 77 and the coarse features 50. The cuts are engraved down to a fine coarse interface stress-sensitive boundary relief level 26 at least 30 µm below the lowest inter-dot relief level 8. The width 17 is at least 10 µm and no wider than the inter-dot spacing 27 determined by the screen ruling of the halftone image.

Figure 4:
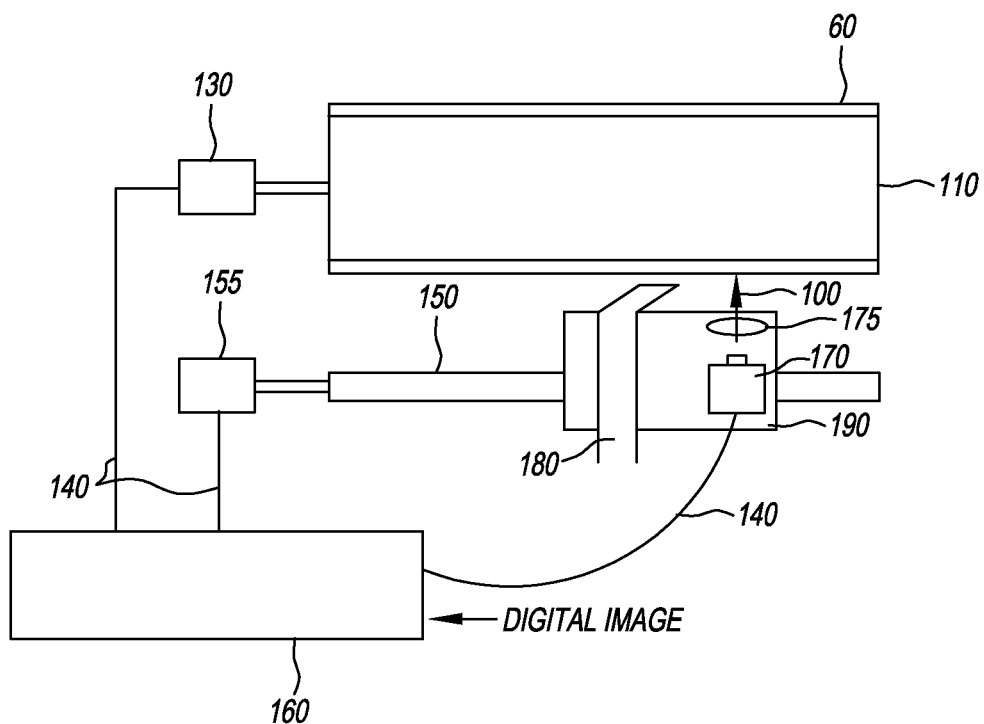
FIG. 4 is a schematic diagram of a laser engraving apparatus used to implement the steps of the current invention.

FIG. 4 shows an apparatus for preparing a flexographic printing plate according to the present invention. A flexographic printing member 60 is mounted on a drum 110 which is turned by motor 130. A lead screw 150 is driven by a lead screw motor 155. A printhead platform 190 is attached to lead screw 150 which moves the platform parallel to a surface of the drum. A laser thermal printhead 170 is mounted on the platform for imaging the flexographic printing member. A lens 175 directs laser radiation 100 to the flexographic printing member. Electrical leads 140 connect various pieces of the apparatus with computer 160 coordinating movement of the drum 110, lead screw 150, and operation of the laser thermal printhead 170. A debris collection system 180 collects detritus generated by laser thermal engraving. A relief image with coarse and fine features is created as described above.

Modeling

A linear elastic two-dimensional model was used to simulate the press interactions between a flexographic member and a receiver and to make predictions for the dot gain and dot gain uniformity associated with the increase in lateral dimension of the top most surface of features under engagement. All materials were treated as isotropic. The model did not contain corrections for non-linearity, known to be important for real elastomers, but the linear model is expected to qualitatively capture the correct trends for phenomenon of interest here provided that the strains are not too high. Also, the model did not specifically include effects due to ink flow and therefore did not include that contribution to dot gain nor the halo effect observed in actual prints. Again, it is expected that the predicted variation in stress at different positions in the flexographic member would lead to qualitatively similar trends for ink spread. Results were found to be in good qualitative agreement with printed examples. Two types of stress-sensitive boundaries, as described above, were investigated and improvements provided by cuts were demonstrated.

The following descriptions of the model predictions can be understood with reference to the tables and figures herein. All distances are in microns unless specified otherwise. One problem to be solved is characterized in Table 1 and FIG. 1a where a floor-interface stress-sensitive boundary, 11, between a course feature region 40, 41, 42, and 43 and floor region was modeled as a function of floor extent 10. In this case a row of four dots, initially 50 µm across at their top most surfaces dot size 48 were near a floor region having 400 µm of relief. In Table 1, the dot 40, closest to the stress-sensitive boundary is referred to as the outer dot and the one furthest from the boundary 43 as the inner dot. A next-nearest-neighbor coarse feature 51, was (100 µm) at its top most surface, and was separated from the stress-sensitive boundary by the floor region with an extent 10 specified in Table 1. Infinity here refers to the limiting case without a next-nearest-neighbor coarse feature 51 (i.e. infinitely far away). The model included one supporting layer representing, for example, a polyester support and another subbing layer representing, for example, a backing tape. The top most surface of the 1.7 mm thick flexographic member 60 was subjected to a strain equivalent to 200 microns of engagement. The computed dot size under stress of the inner and outer dots and a measure of dot gain non-uniformity, NU given by % NU=100 (Outer size−Inner size)/Inner size (1)

are reported in Table 1. Results showed 4% non-uniformity when no solid feature was present improving to 2% when the nearest neighbor coarse feature was about 1000 µm away. As the extent of the floor region was reduced the non-uniformity monotonically improved. At 225 µm the non-uniformity was less than half a percent.

TABLE 1

Dot size and non-uniformity predictions versus. floor length extent, initial dot size 50 µm; initial relief 400 µm

| Floor Length (µm) | Inner Dot (µm) | Outer Dot (µm) | Non-Uniformity |
|---|---|---|---|
|  | 53.0 | 55.2 | 4.0% |
| 1425 | 52.9 | 54.5 | 3.0% |
| 1025 | 52.7 | 53.8 | 2.0% |
| 425 | 52.4 | 52.8 | 0.9% |
| 225 | 52.3 | 52.5 | 0.4% |

Table 2 shows the improvement achievable when a cut of 400 µm of increased relief, 50 µm wide, was engraved at the stress-sensitive boundary. In this case the original dot size 48 before engagement was 25 µm and no nearest neighbor solid was present (i.e. infinite floor extent). The calculated non-uniformity was improved from 4.9% to 1.6%, better than a factor of 3 when the cut was made at the stress-sensitive boundary.

TABLE 2

Dot size and non-uniformity predictions with and without a cut at a stress sensitive boundary; initial dot size 25 µm, initial relief 500 µm

| Description | Cut Depth (µm) | Inner Dot (µm) | Outer Dot (µm) | Non-Uniformity |
|---|---|---|---|---|
| No Cut | 0 | 27.5 | 28.9 | 4.9% |
| Cut | 400 | 27.6 | 28.1 | 1.6% |

Predicted improvements achievable when the stress-sensitive boundary contains a non-printable plateau 12 (see FIG. 2a) are reported in Table 3. In this case initial dot size 48 was 25 µm, the floor relief was 500 µm and the plateau 12 was 50 µm wide. The cuts, as illustrated in FIG. 2b, were 25 µm wide and had depths as indicated in the Table 3. The calculated non-uniformity improved from 6.7% without cuts to 0.3% with 1550 µm cuts.

TABLE 3

Dot size and non-uniformity predictions with and without a cut at a stress sensitive boundary containing a plateau; initial dot size 25 µm, initial relief 500 µm

| Description | Cut Depth (µm) | Inner Dot (µm) | Outer Dot (µm) | Non-Uniformity |
|---|---|---|---|---|
| No Cut | 0 | 27.6 | 29.4 | 6.7% |
| Cut | 500 | 27.7 | 28.7 | 3.7% |
| Cut | 1550 | 27.4 | 27.2 | 0.3% |

Table 4 compares the predictions for 1.2 mm and 1.7 mm thick flexographic members as a function of dot size and cut depth. It was found that non-uniformity was worse for smaller dots as has been observed in real press runs and that non-uniformity was generally worse for thinner flexographic members. Modeling showed that cuts at the stress-sensitive boundary improved non-uniformity and that deeper cuts were better.

TABLE 4

Non-uniformity predictions versus cut depth, initial dot size and flexographic plate thickness; initial relief 400 µm

| Cut Depth (µm) | Plate Thickness = 1200 Initial Dot size | | | Plate Thickness = 1700 Initial Dot size | | |
|---|---|---|---|---|---|---|
|  | 25 µm | 50 µm | 100 µm | 25 µm | 50 µm | 100 µm |
| 0 | 6.4% | 4.3% | 2.8% | 5.0% | 3.3% | 2.0% |
| 200 | 3.7% | 2.6% | 1.8% | 2.8% | 1.8% | 1.2% |
| 400 | 2.4% | 1.6% | 1.2% | 1.6% | 1.0% | 0.7% |
| 600 | 1.8% | 1.2% | 0.9% | 1.0% | 0.5% | 0.4% |

The problem and solution of the current invention for fine-coarse-interface stress-sensitive boundaries are described with reference to Table 5 and FIGS. 3a and 3b. The displacement between the initial levels 6 of the fine feature inner dot 77 and fine feature outer dots 70 before and after 150 µm of engagement on the coarse features 50 are shown Table 5. The engagement non-uniformity, ENU, as a function of cut depth 26 given by ENU=Inner displacement−Outer displacement (2)

is also reported in the table. The displacements and ENUs were calculated for combinations of subbing layer hardness. The first descriptor in column 1 Table 5 refers to the relative hardness of the supporting layer 80 and the second to the backing layer 90. The Young's modulus of the flexographic member 60 was 1 (dimensionless units), the soft layers were 0.1 and the hard layers were 10. Cut width 17 was 20 µm and depth 26 was as indicated in Table 5. Results show monotonic improvement of engagement non-uniformity in all cases with increasing cut depth. The cuts were most effective for hard supporting and subbing layers.

TABLE 5

Engagement non-uniformity predictions versus cut depth, and subbing layer hardness; initial inter dot relief 250 µm, initial fine-feature undercut 150 µm

| Description Sub Layers | Cut Depth (µm) | Outer Displacement (µm) | Inner Displacement (µm) | Engagement non-uniformity (µm) |
|---|---|---|---|---|
| Soft/Soft | 0 | 102 | 49 | 53 |
|  | 400 | 85 | 39 | 46 |
|  | 800 | 59 | 28 | 31 |

TABLE 5-continued

Engagement non-uniformity predictions versus cut depth, and subbing layer hardness; initial inter dot relief 250 μm, initial fine-feature undercut 150 μm

| Description Sub Layers | Cut Depth (μm) | Outer Displacement (μm) | Inner Displacement (μm) | Engagement non-uniformity (μm) |
|---|---|---|---|---|
| Hard/Soft | 0 | 98 | 58 | 40 |
|  | 400 | 82 | 51 | 31 |
|  | 800 | 61 | 42 | 19 |
| Hard/Hard | 0 | 41 | −7 | 48 |
|  | 400 | 19 | −5 | 24 |
|  | 800 | 3 | −2 | 5 |

The invention has been described in detail with particular reference to certain preferred embodiments thereof, but it will be understood that variations and modifications can be effected within the spirit and scope of the invention.

PARTS LIST

| 6 | fine-feature top most level |
| 8 | lowest inter-dot relief level |
| 9 | critical printable level |
| 10 | floor region extent |
| 11 | floor-interface stress-sensitive boundary |
| 12 | non-printable plateau |
| 13 | fine coarse interface stress-sensitive boundary |
| 14 | floor-interface stress-sensitive boundary increased relief |
| 15 | fine coarse interface stress-sensitive boundary increased relief |
| 16 | floor-interface stress-sensitive boundary increased relief width |
| 17 | fine coarse interface stress-sensitive boundary width |
| 18 | floor-interface stress-sensitive boundary relief level |
| 19 | half total distance to next closest printable feature |
| 20 | floor relief level |
| 24 | non-printable plateau angled wall |
| 26 | fine coarse interface stress-sensitive boundary relief level |
| 27 | inter dot spacing |
| 30 | top most flexographic plate member surface |
| 40 | outer-dot coarse highlight feature |
| 41 | coarse highlight feature |
| 42 | coarse highlight feature |
| 43 | inner-dot coarse highlight feature |
| 48 | coarse highlight feature dot size |
| 50 | coarse features |
| 51 | next-nearest-neighbor coarse feature |
| 60 | flexographic member |
| 70 | fine feature outer dots |
| 71 | fine feature dot |
| 75 | fine-feature dots |
| 77 | fine feature inner dot |
| 80 | supporting layer |
| 90 | backing layer |
| 100 | laser radiation |
| 110 | drum |
| 130 | motor |
| 140 | electrical leads |
| 150 | lead screw |
| 155 | lead screw motor |
| 160 | computer |
| 170 | laser thermal printhead |
| 175 | lens |
| 180 | debris collection system |
| 190 | printhead platform |

The invention claimed is:

1. A system for preparing a relief image on a flexographic plate comprising:
 a memory device for storing the relief image;
 a computer for identifying at least one boundary region in the relief image adjacent to at least one image feature and for controlling a laser;
 a laser for printing the relief image on the flexographic plate; and
 increasing a depth of at least a portion of a floor region adjacent the at least one image feature directly with the laser.

2. The system of claim 1 wherein a minimum width of the increase in the floor region is at least 2 μm.

3. The system of claim 1 wherein a maximum width of the increase in the floor region is a distance to a top of a next image feature.

4. The system of claim 1 wherein a minimum depth of the increase in the floor region is at least 2 μm.

5. The system of claim 1 wherein a maximum depth of the increase in the floor region is less than a depth of a backing layer of the flexographic plate.

6. The system of claim 1 wherein the depth of the floor region is increased by laser engraving.

7. The apparatus of claim 1 wherein relief image is calculated on a computer.

* * * * *